United States Patent
Holt et al.

(10) Patent No.: US 10,807,434 B2
(45) Date of Patent: Oct. 20, 2020

(54) DUAL RATE VEHICLE SUSPENSION SYSTEM

(71) Applicant: Multimatic Inc., Markham (CA)

(72) Inventors: Laurence J Holt, Uxbridge (CA); Damian O'Flynn, Suffolk (GB)

(73) Assignee: Multimatic Inc., Markham (CA)

( * ) Notice: Subject to any disclaimer, the term of this patent is extended or adjusted under 35 U.S.C. 154(b) by 107 days.

(21) Appl. No.: 16/066,161

(22) PCT Filed: Jan. 6, 2017

(86) PCT No.: PCT/US2017/012588
§ 371 (c)(1),
(2) Date: Jun. 26, 2018

(87) PCT Pub. No.: WO2017/120509
PCT Pub. Date: Jul. 13, 2017

(65) Prior Publication Data
US 2019/0009632 A1    Jan. 10, 2019

Related U.S. Application Data

(60) Provisional application No. 62/276,499, filed on Jan. 8, 2016.

(51) Int. Cl.
*B60G 17/027*    (2006.01)
*B60G 11/50*     (2006.01)
*B60G 7/00*      (2006.01)

(52) U.S. Cl.
CPC ........... *B60G 17/027* (2013.01); *B60G 7/001* (2013.01); *B60G 11/50* (2013.01);
(Continued)

(58) Field of Classification Search
CPC ............... B60G 17/005; B60G 17/027; B60G 17/0272; B60G 11/50; B60G 2202/12;
(Continued)

(56) References Cited

U.S. PATENT DOCUMENTS

| 3,083,034 A | 3/1963 | Hollowell |
| 3,773,346 A | 11/1973 | Scheublein et al. |

(Continued)

FOREIGN PATENT DOCUMENTS

| FR | 1153797 A | 3/1958 |
| JP | S59-180030 U | 12/1984 |

(Continued)

OTHER PUBLICATIONS

International Search Report and Written Opinion for International Application No. PCT/US2017/012588 dated Apr. 11, 2017.
(Continued)

*Primary Examiner* — Laura Freedman
(74) *Attorney, Agent, or Firm* — Carlson, Gaskey & Olds, P.C.

(57) ABSTRACT

A selectively switchable dual rate vehicle suspension system comprising a pushrod actuated inboard spring configuration, conventionally oriented between the unsprung mass and the sprung mass of one corner of the vehicle, comprising a torsion bar spring of a first predetermined rate, K1, and a coil spring of a second predetermined rate, K2, arranged in series so as to provide a total combined spring rate KT. A lockout actuator is arranged in parallel with the coil spring and configured so that in a first mode it allows the coil spring to move freely and in a second mode prevents motion of the coil spring such that when the lockout actuator is in a first, unlocked, mode the overall vehicle suspension spring rate is defined by the series equation 1/KT=1/K1+1/K2, and when the lockout actuator is in a second, locked, mode the overall vehicle suspension spring rate is substantially higher as defined by KT=K1, thus selectively providing both a low rate, optimal ride comfort setting and a high rate, optimal handling setting.

5 Claims, 5 Drawing Sheets (52) U.S. Cl.
CPC ...... *B60G 17/0272* (2013.01); *B60G 2202/12* (2013.01); *B60G 2202/13* (2013.01); *B60G 2202/132* (2013.01); *B60G 2204/421* (2013.01)

(58) Field of Classification Search
CPC .......... B60G 2202/13; B60G 2202/132; B60G 2204/4605; B60G 2204/421; B60G 2204/46; B60G 7/001
See application file for complete search history.

(56) References Cited

U.S. PATENT DOCUMENTS

| | | | | |
|---|---|---|---|---|
| 4,145,073 | A | * | 3/1979 | McLuckie ............ B60G 17/005 280/124.101 |
| 4,913,457 | A | | 4/1990 | Hafner et al. |
| 5,687,960 | A | * | 11/1997 | Moon ................. B60G 11/181 267/154 |
| 5,722,645 | A | | 3/1998 | Reitter |
| 5,725,239 | A | | 3/1998 | de Molina |
| 5,839,742 | A | | 11/1998 | Holt |
| 6,357,771 | B1 | | 3/2002 | Clements et al. |
| 6,923,434 | B2 | | 8/2005 | Schisler |
| 6,945,522 | B2 | * | 9/2005 | Eshelman ............ B60G 11/181 267/273 |
| 7,549,658 | B2 | | 6/2009 | Kunert et al. |
| 8,356,807 | B2 | | 1/2013 | Kerr et al. |
| 9,085,214 | B2 | * | 7/2015 | Nachbar ................ B60G 11/50 |
| 9,108,482 | B2 | * | 8/2015 | Mohrlock ............ B60G 17/025 |
| 9,150,070 | B2 | * | 10/2015 | Luttinen ................ B60G 3/265 |
| 2006/0197301 | A1 | | 9/2006 | Kunert et al. |
| 2010/0225084 | A1 | * | 9/2010 | Chapman ............ B60G 11/183 280/124.107 |
| 2013/0127131 | A1 | | 5/2013 | Michel |

FOREIGN PATENT DOCUMENTS

| | | |
|---|---|---|
| JP | H03-273919 A | 12/1991 |
| JP | H11-22775 A | 1/1999 |

OTHER PUBLICATIONS

International Preliminary Report on Patentability for International Application No. PCT/US2017/012588 dated Jul. 19, 2018.
Japanese Office Action for Japanese Application No. 2018-535097 dated Jul. 3, 2019.
Indian Examination Report for Indian Application No. 201817024291 dated May 27, 2020.

* cited by examiner

DUAL RATE VEHICLE SUSPENSION SYSTEM

CROSS-REFERENCE TO RELATED APPLICATIONS

This application is a United States National Phase Application of PCT Application No. PCT/US2017/012588 filed on Jan. 6, 2017, which claims priority to U.S. Provisional Application No. 62/276,499 which was filed on Jan. 8, 2016 and is incorporated herein by reference in its entirety.

BACKGROUND

This invention relates to a suspension system for wheeled vehicles and, specifically, to a suspension system that offers two distinct modes of operation. To overcome the inherent compromise that must be made between optimizing the ride comfort and optimizing the handling capability of a road vehicle, the present invention provides a dual mode suspension system in which the rate of the primary road spring can be switched between an optimal handling setting and an optimal ride comfort setting.

Vehicle suspension predates the motorized car and was originally introduced on horse drawn conveyances to isolate the occupant from road disturbances. The basic premise of vehicle suspension is to allow the wheels of a vehicle to independently travel up and over bumps rather than the entire vehicle and its occupants. This arrangement provides the following major benefits:
  a) the passengers are no longer directly subjected to the effect of the road disturbance, so what the industry refers to as "ride comfort" is significantly enhanced;
  b) the energy associated with moving the wheels over the road disturbance is far less than what would be required to lift the entire vehicle over it, so a substantial energy efficiency is realized; and
  c) the steering control of the vehicle is significantly enhanced as speed increases, as the entire vehicle mass is not pitched around over the road disturbances.

Vehicle suspension can be configured in many ways, but it is generally arranged so as to isolate the main vehicle body, which is referred to as the "sprung mass", from the wheel systems, which are referred to as the "unsprung masses", via an energy storage medium, normally a spring of some type. The spring stores energy as the wheel system, which includes a hub, brake and motion control linkage, is allowed to move relative to the main vehicle body in response to road disturbances. Once a disturbance has been passed, the spring then releases its stored energy to return the wheel system back to its undisturbed state. The spring generates a force in proportion to its displacement but does not dissipate energy. Unfortunately a suspension system that is configured with just an energy storage element exhibits an uncontrolled oscillatory response that is well known in the physics of simple spring-mass systems. Without some form of damping, a disturbed spring-mass system will continue to oscillate unless external forces are applied. In a vehicle suspension system, these calming forces are normally generated by some form of damping device, most prevalently, a hydraulic based component that generates a force proportional to velocity. In this way, the damper provides a resisting force in both directions of the spring motion and therefore settles the spring to zero velocity at the undisturbed position. It is important to note that the damper is strictly a secondary suspension component, as it cannot support the vehicle body; it is the spring that provides this primary function.

As the limits of a vehicle's dynamic response are approached, the suspension system, which includes the motion control linkages and the energy storage and damper components, becomes a constraining factor in reaching optimal performance levels. If the springs and dampers are tuned relatively softly, in the interest of providing a high level of occupant isolation from the road disturbances, then the sprung mass tends to move excessively in response to the lateral and longitudinal forces generated by the steering, accelerating and braking demands of the driver. These demands result in what is generally referred to as 'handling response' while the quality of the occupant isolation is termed 'ride response'.

By changing the spring rates and damping coefficients at each of the four wheel corners, although cross-vehicle pairs are normally exactly matched, the ride and handling performance of the vehicle can be optimized. Generally, a stiffer spring rate, measured in force per unit displacement, returns a firmer ride and superior vehicle body control, whereas a softer spring rate gives a softer ride but less control. The damping coefficients are normally directly tuned to their related spring rate. Unfortunately, the optimal ride response occurs with lower spring rates and the optimal handling response occurs with higher spring rates. This has historically resulted in vehicles being tuned to a compromise of ride and handling responses.

There have been numerous attempts to provide less compromised vehicle suspension tuning by introducing variable regimes. U.S. Pat. No. 3,083,034 to Hollowell illustrates an early approach to this type of variable suspension, as it describes a method for providing both a variable spring rate and ride height using an adjustable arrangement to change the effective length of a leaf spring. In this manner, the optimal suspension setting can be chosen to suit the condition of either a heavily or lightly loaded sprung mass. At the time of the '034 patent (1960), the leaf spring was the prevalent energy storage medium on the loaded axle of road vehicles, but as vehicle suspensions adopted the now more prevalent coil and torsion springs, adaptive rate changing also evolved.

U.S. Pat. No. 5,722,645 to Reitter describes a method for manually adjusting the free length of a coil spring within a fixed vehicle suspension strut arrangement. It is generally understood that shortening the free length of a coil spring increases its rate and, conversely, lengthening lowers it. The spacing element described in the '645 patent allows the effective length of a coil spring to be adjusted via selectively trapping one end in a cooperative receiving groove and retaining it with locking device. In this way, the spring free length can be manually shortened, which both increases its rate and lowers the ride height of the vehicle. Conversely, the free length can be lengthened to reduce its rate and increase the vehicle's ride height.

It has generally been recognized that having a stiffer spring rate when a vehicle is heavily loaded is preferable to when it lightly loaded, as the natural frequency of the spring/mass system can be kept relatively constant. Natural frequency is the physical input that the passenger actually feels and it is described as $\omega=\sqrt{k/m}$ where k is the spring stiffness or rate, and m is the mass. If the mass is increased then the spring rate also needs to increase proportionally to maintain the same natural frequency and keep the disturbance input to the passenger similar. A number of non-linear spring arrangements have been conceived that ultimately provide for two spring rates with a cross over point at a predetermined load, which for practicality is physically implemented via a spring displacement. U.S. Pat. No. 3,773,346 to Scheublein et al. describes a vehicle suspension system that incorporate coil springs that provide for a change in rate at a predetermined displacement so that the natural frequency is modified as load is increased or decreased. Similarly U.S. Pat. No. 6,357,771 to Clements et al. offers an alternative method to achieving a dual rate suspension characteristic by utilizing a primary torsion bar element in series with a coil spring biasing member which provides an elastic resistance to the torsion bar rotation until a predetermined force is exceeded. U.S. Pat. No. 7,549,658 to Kunert et al. describes a similar torsion bar and coil spring arrangement to the '771 patent, but with the torsion bar arranged inboard of the main sprung mass operated by a pressure rod. Although the coil spring can be locked out using a distance sleeve or a square or rectangular profile coil spring, the lockout is only instantaneous in response to road conditions. There is no operator control of the spring rate so the system is passive. No setting or change of ride height is intended by the engagement or lockout of the coil spring. Passive dual rate suspension systems also have been employed in which torsion bar elements are arranged coaxially in series with one another, as described in U.S. Pat. No. 6,945,522 to Eschelman and U.S. Pat. No. 5,687,960 to Moon. U.S. Pat. No. 5,839,742 to Holt describes a further approach to providing a dual rate suspension by utilizing a cam operated arrangement that employs two distinct angled surfaces on the spring driver cam. The '742 patent also adds an adaptive aspect by using an actuator to alter the relationship between the wheel travel and the spring driver cam so that the dual rate change can be actively controlled.

Multiple mode, adaptive and fully active suspension systems have been implemented, with the majority being no more than electronic valve control of the shock absorbers. As previously described, the damper is a secondary suspension component and does not truly offer a choice between soft and stiff spring rates and the relative change in natural frequency that result. U.S. Pat. No. 4,913,457 to Häfner et al. claims an adaptive suspension system that continuously monitors wheel load and regulates the level of the vehicle body and/or the damping characteristics of the shock absorbers. This system is a sophisticated adaptive approach, but again does not control the actual spring rate and, therefore, the natural frequency of the sprung mass. U.S. Pat. No. 5,725,239 to de Molina describes an adaptive suspension system for motor vehicles that incorporates a pneumatic arrangement that connects air springs with fluid cushion shock absorbers and provides high and low pressure circuits that result in two different spring rates and ride frequencies. Although this is the ultimate goal of a selective dual mode suspension system, the usage of air springs is not desirable for a high performance vehicle due to their weight, complexity, difficulty in achieving Hooke's law of linear rate response and poor reliability relative to metallic energy storage devices. U.S. Pat. No. 6,923,434 to Schisler similarly describes an air spring that provides both ride height and spring rate adjustment by using rubber sleeve chambers that can be adjustably pressurized. The air spring is therefore adapted to provide a relatively low spring rate at a lower height and a relatively high spring rate at a higher height. In addition to the shortcomings associated with air springs previously described, the '434 configuration provides the opposite relationship of what is required in a high performance vehicle, which is a low spring rate in a high ride height and a high spring rate in a low ride height.

By the same token, FR1153797 to Kraus provides a means to maintain a stable ride height for a racing car rather than high and low ride heights depending on driving conditions. It does this using a torsion bar and a coil spring in series, along with a pneumatic cylinder and piston in parallel with the coil spring. The resulting total suspension stiffness can be expressed as $1/K_{total}=1/K_{torsion\ bar}+1/(K_{coil\ spring}+K_{air\ cylinder\ f(P,d)})$ This configuration essentially maintains uniform road holding and driving properties during the course of a race despite the rapidly changing weight of fuel, which would otherwise alter those properties as ride height changes. In order to offset the changing weight of fuel, the system starts with high pressure in the pneumatic cylinder effectively unloading the coil spring. This creates the highest vehicle mass supporting suspension spring force and total suspension stiffness, thus supporting the vehicle at the correct ride height with a full tank. Even in this state, the coil spring along with the pneumatic spring may be engaged in response to high suspension inputs which compresses the air in the cylinder sufficiently and also engages the coil spring accordingly. As fuel is depleted, the pressure in the air cylinder is gradually reduced thus altering the pneumatic spring rate such that the combined stiffness of the coil spring and air cylinder drops, even with the progressively engaging coil spring. This maintains the vehicle at the correct ride height with its now reduced weight owing to the fact that less mass is required to deflect the suspension to the same extent. The reduction in pressure may occur in either a step fashion under driver control of the air pressure in the cylinder, or continuously by controlling the air pressure in the cylinder automatically in response to a signal from a sensor measuring ride height or fuel level, for example. This provides a continually decreasing overall spring rate, again in either a stepped or continuous manner, during the course of a race between fueling stops. When the fuel tank is eventually refilled, the process is repeated. Thus, the overall spring rate changes continually through an available spectrum to maintain a single ride height while the car is being driven.

There are numerous other adaptive and manual dual rate suspension systems described in the art, but none capable of providing the required characteristic of a performance vehicle using metallic energy storage devices such as coil, leaf or torsion springs.

SUMMARY

In one exemplary embodiment, a selectively switchable dual rate vehicle suspension system comprising a pushrod actuated inboard spring configuration, conventionally oriented between the unsprung mass and the sprung mass of one corner of the vehicle, comprising a torsion bar spring of a first predetermined rate, K1, and a coil spring of a second predetermined rate, K2, arranged in series so as to provide a total combined spring rate KT. A lockout actuator is arranged in parallel with the coil spring and configured so that in a first mode it allows the coil spring to move freely and in a second mode prevents motion of the coil spring such that when the lockout actuator is in a first, unlocked, mode the overall vehicle suspension spring rate is defined by the series equation 1/KT=1/K1+1/K2, and when the lockout actuator is in a second, locked, mode the overall vehicle suspension spring rate is substantially higher as defined by KT=K1, thus selectively providing both a low rate, optimal ride comfort setting and a high rate, optimal handling setting.

In a further embodiment of any of the above, the lockout actuator comprises a hydraulic cylinder and hydraulic circuit that selectively opens and closes a connection between two volumes within the hydraulic cylinder so as to provide a first, unlocked, mode and a second, locked, mode.

In a further embodiment of any of the above, the lockout actuator comprises a hydraulic cylinder and hydraulic circuit that selectively opens and closes a connection between two volumes within the hydraulic cylinder so as to provide a first, unlocked, mode and a second, locked, mode, additionally, the hydraulic circuit is configured to power the hydraulic actuator so as to drive the coil spring to a predetermined position so that the ride height of the vehicle, in the K1 spring rate mode, can be prescribed.

In a further embodiment of any of the above, the lockout actuator comprises a hydraulic cylinder and hydraulic circuit that selectively opens and closes a connection between two volumes within the hydraulic cylinder so as to provide a first, unlocked, mode and a second, locked, mode, additionally, the hydraulic circuit is configured to power the hydraulic actuator so as to drive the coil spring to a predetermined position so that the ride height of the vehicle, in the K1 spring rate mode, can be relatively lower than in the 1/K1+1/K2 spring rate mode.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Accordingly, in view of the limitations of the prior art adaptive suspension systems and, more specifically, those using dual rate springs, it would be advantageous to provide a fully automatic, selectable arrangement that allows the spring rate and ride height to be switched between two distinct modes of operation independently of ride height or vehicle load. This type of approach provides a method of choosing between an optimal vehicle handling setting, characterized by a relatively higher natural frequency and low ride height, and an optimal ride comfort setting, characterized by a relatively lower natural frequency and high ride height.

The present invention utilizes the simple principal of mechanics in which two springs, that obey Hooke's law of linear rate response, when placed in series, act as a single Hookean spring with a lower linear rate than either of the individual springs. Two springs of rate $K_1$ and $K_2$ placed end to end in series will return a total spring rate, $K_T$, described by the following simple equation:

$$1/K_T = 1/K_1 + 1/K_2 \qquad \text{(Equation 1)}$$

In a primary embodiment of the present invention, the energy storage medium of one corner of a vehicle comprises a torsion bar spring of a first predetermined rate, $K_1$, and a coil spring of a second predetermined rate, $K_2$, arranged in series and conventionally oriented between the unsprung mass and the sprung mass. In this way, in a first mode of operation, the overall spring rate of the suspension is $K_T$ as described by the series equation. A hydraulic actuator, with a locking function, is also included in parallel with the coil spring so that, on command, the $K_2$ rate can be locked out and so the overall spring rate of the suspension becomes $K_1$. Additionally, the hydraulic actuator can be powered to drive the coil spring to a predetermined position so that the ride height of the vehicle, in the $K_1$ spring rate mode, can be prescribed.

Figure 1:
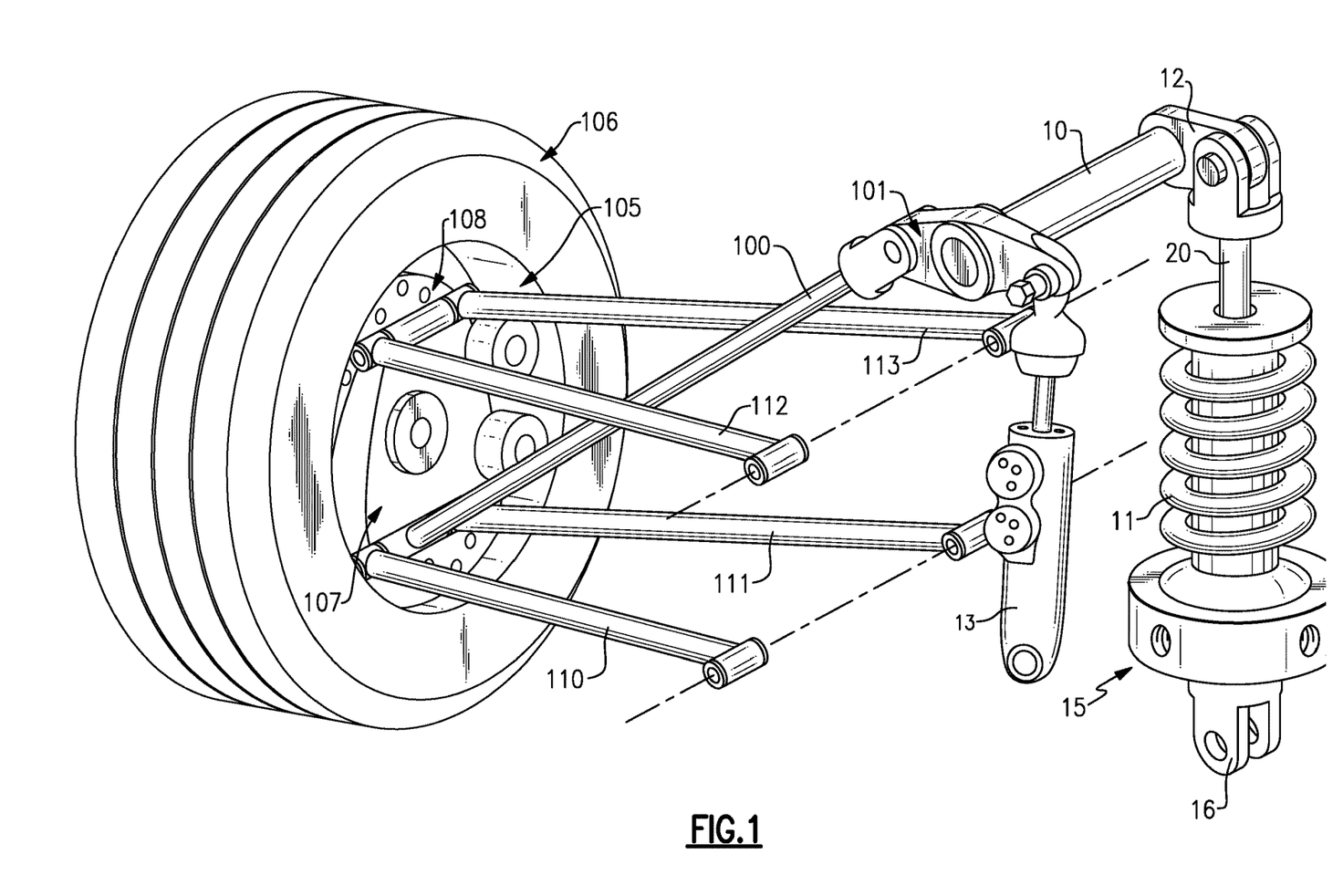
FIG. 1 is a schematic view of one disclosed suspension embodiment at one corner of a vehicle.

FIG. 1 illustrates the primary embodiment of the present invention installed on one corner of a vehicle that utilizes conventional double wishbone suspension for motion control and an inboard pushrod actuated energy storage medium. A torsion bar spring 10 is conventionally actuated by a pushrod 100 and rocker 101 arrangement. The torsion bar spring 10 is driven from the centre of rotation of the rocker 101 and the pushrod 100 is connected to a suspension spindle 107 at the end opposite its attachment to the rocker 101. A wheel 105, tire 106, brake assembly 108 and the spindle 107 make up an unsprung corner of a vehicle which is attached to the vehicle structure via a series of motion control linkages 110, 111, 112 and 113 that have been configured to constrain the movement of the unsprung corner to a single degree of freedom, along a predetermined, functionally desirable motion path. When the unsprung corner moves through its motion path, it rotates the rocker 101 via the pushrod 100 and induces a torque on the torsion bar spring 10. A damper 13, such as a conventional shock absorber, is connected between the vehicle support structure and the rocker 101, at a distance from a longitudinal axis of the torsion bar spring 10, to damp the motion of the unsprung corner. It should be understood that the damper 13 may be incorporated into the system in a different configuration if desired.

In a first mode of operation, the rotary motion of the rocker 101 either stores or releases strain energy in the combination of the torsion bar spring 10 and a coil spring 11 arranged in series so that the coil spring 11 is displaced by the rotary motion at the distal end of the torsion bar spring 10 via an actuation arm 12. The coil spring 11 is anchored to the vehicle structure at the opposing end to the actuation arm 12 via a grounded joint 16. In this first mode of operation, the combined spring rate acting on the unsprung corner of the vehicle, $K_{sr}$, is defined by the following equation:

$$1/K_{sr} = 1/K_{tb} + 1/K_{cs} \qquad \text{(Equation 2)}$$

Where $K_{tb}$ is the spring rate of the torsion bar spring 10 and $K_{cs}$ is the spring rate of the coil spring 11. This equation returns a combined spring rate ($K_{sr}$) that is less than either of the individual rates and so a lower natural frequency results providing an optimal ride comfort setting.

In a second mode of operation, a hydraulic lockout actuator 15, configured coaxially with the coil spring 11, is activated so that it behaves as a solid link and prevents compression of the coil spring 11. In this manner, the rotary motion of the rocker 101 either stores or releases strain energy in only the torsion bar spring 10 as its distal end is now anchored to the vehicle structure via the active lockout actuator 15. In this second mode of operation, the spring rate acting on the unsprung corner of the vehicle, $K_{sr}$, is defined as follows:

$$K_{sr}=K_{tb} \quad \text{(Equation 3)}$$

In this second mode of operation, the spring rate acting on the unsprung corner of the vehicle increases substantially over the first mode of operation, which increases the natural frequency and provides an optimal handling setting.

Figure 2:
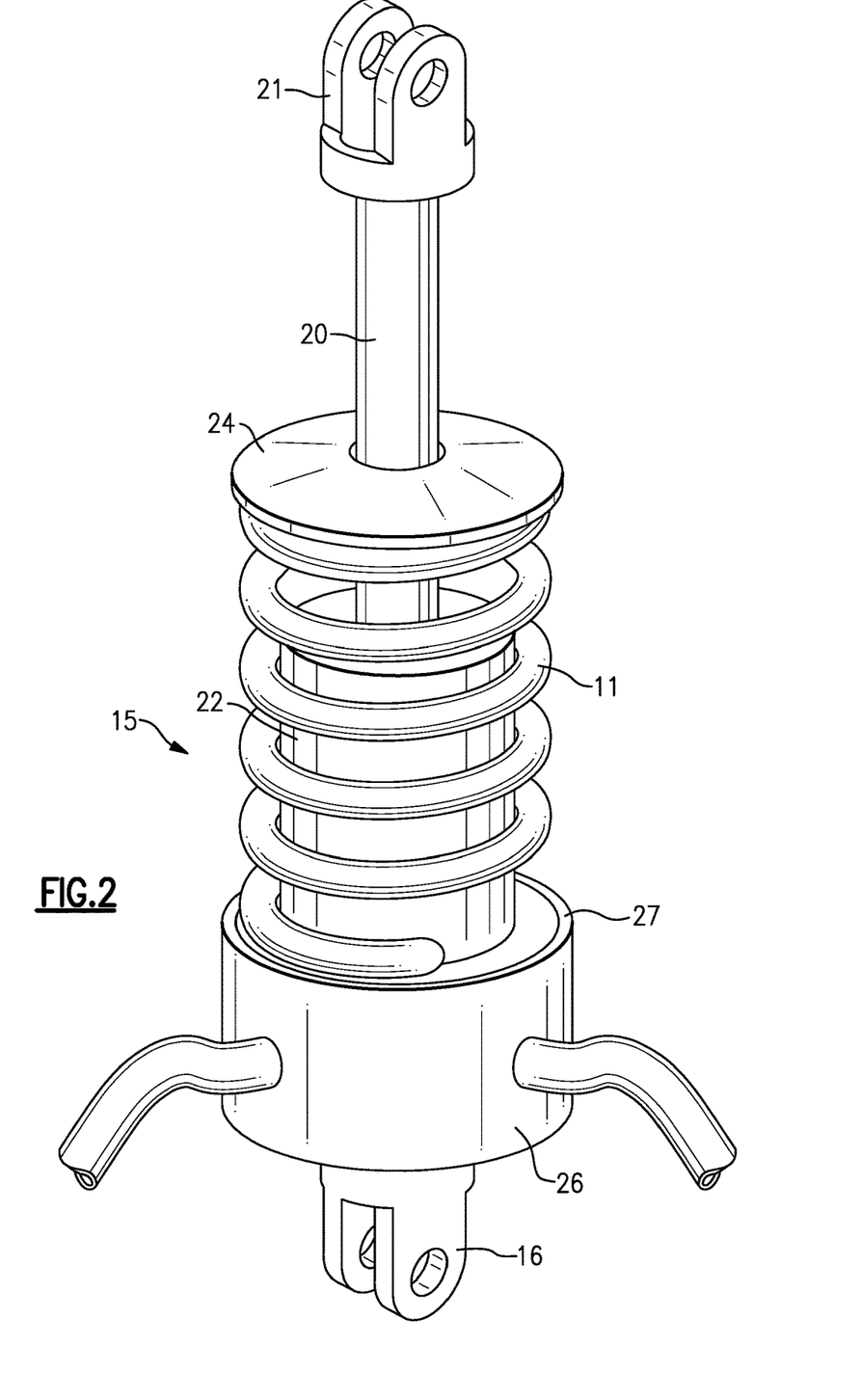
FIG. 2 is an enlarged perspective view of a hydraulic lockout actuator used in the suspension shown in FIG. 1.
Figure 3:
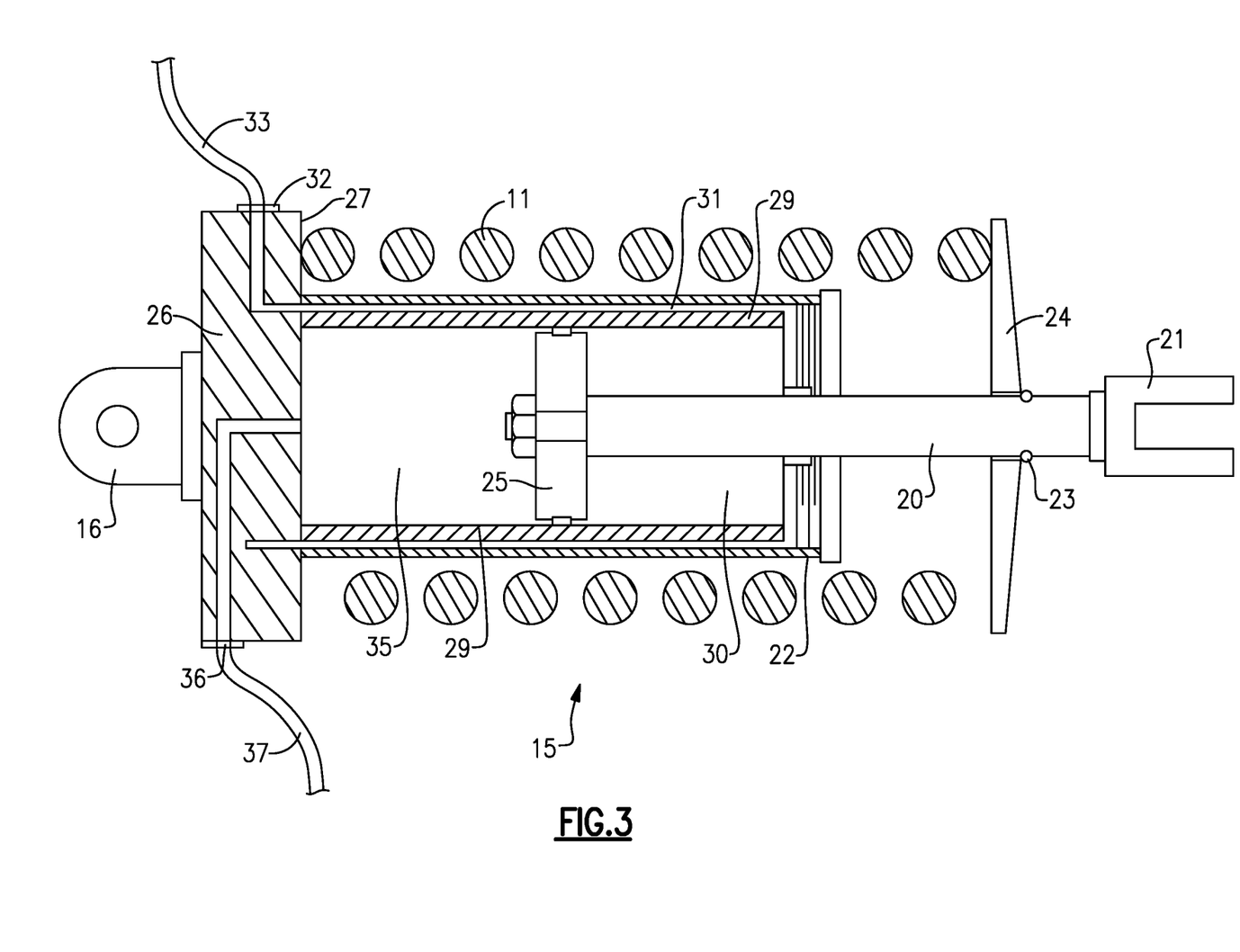
FIG. 3 is a cross-sectional view of the hydraulic lockout actuator shown in FIG. 2.

The hydraulic lockout actuator 15 is illustrated in further detail in FIG. 2 and is constructed from a body 22, a shaft 20, a shaft clevis 21, a grounded joint 16, a top spring plate 24, a lower spring perch 27 and a hydraulic manifold cap 26. A circlip 23 is provided between the shaft 20 and the top spring plate 24, as best shown in FIG. 3. The grounded joint 16 is mounted to the vehicle structure via a bolt or similar fastener and the shaft clevis 21 is rotationally attached to the outer point of the actuation arm 12. The coil spring 11 is coaxially located around the shaft 20 and body 22 of the lockout actuator 15, with one end supported by the lower spring perch 27 and the other end held in preload by the top spring plate 24. Additional detail is shown in FIG. 3 of how the hydraulic lockout actuator 15 shaft 20 is rigidly attached to a cylindrical piston 25, which is adapted to travel within a cylindrical bore 29. In this manner, the cylindrical bore 29 is divided into two variable operating volumes 30 and 35 that are filled with a suitable hydraulic fluid. The hydraulic manifold cap 26 is internally arranged so as to provide a hydraulic path 31 between the upper hydraulic volume 30 and a first external port 32 and the lower hydraulic volume 35 and a second external port 36.

In the first mode of operation, the two external ports 32 and 36 are connected directly together and therefore hydraulic fluid is allowed to flow freely between the two hydraulic volumes 30 and 35. In this way, the cylindrical piston 25 is free to move within the cylindrical bore 29 and so movement of the coil spring 11 is unimpeded allowing it to act in series with the torsion bar spring 10.

In the second mode of operation, the two external ports 32 and 36 are blocked from each other and, therefore, hydraulic fluid is prohibited from flowing between the two hydraulic volumes 30 and 35. In this way, the cylindrical piston 25 cannot move within the cylindrical bore 29 and so the coil spring 11 is locked and, therefore, only the torsion bar spring 10 is available to store the energy imparted by suspension movement.

Figure 4:
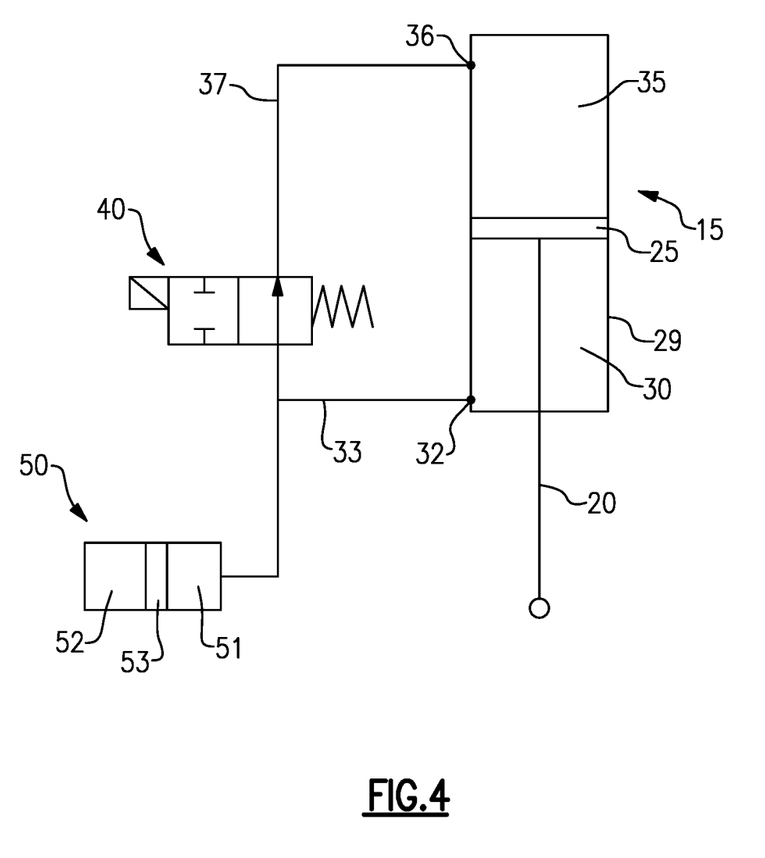
FIG. 4 is a schematic of one example embodiment of a hydraulic control circuit used with the suspension shown in FIG. 1.

A schematic of the hydraulic control circuit used to open and close the connection between the two external ports, 32 and 36, of the hydraulic lockout actuator 15 is illustrated in FIG. 4. A two port, two position, electrically piloted hydraulic valve 40 is connected between the first external port 32 and second external port 36 via hydraulic lines 33 and 37 respectively. The hydraulic valve 40 is configured to be normally open so that the hydraulic lines 33 and 37 are connected directly with no blockage. In this configuration, hydraulic fluid can flow freely between the two hydraulic volumes 30 and 35. In this way, the cylindrical piston 25 is free to move within the cylindrical bore 29.

When a suitable electrical signal is imparted on the hydraulic valve 40, it switches to a closed, or blocked, position and hydraulic fluid is prohibited from flowing between the two hydraulic lines 33 and 37 and, therefore, the hydraulic volumes 30 and 35 respectively. In this mode, the cylindrical piston 25 cannot move within the cylindrical bore 29. Additionally, for the sake of practical operation, a compensator 50 is introduced in the hydraulic circuit within the hydraulic line 33 so as to provide a volume for the hydraulic fluid displaced by the shaft 20 entering the hydraulic lockout actuator 15 to be stored. The compensator 50 consists of a hydraulic storage volume 51, a floating piston 53 and a pressurized gas volume 52 configured so that as the shaft 20 enters the hydraulic lockout actuator 15, when the hydraulic valve 40 is in its normally open position, the hydraulic fluid displaced by the shaft 20 is stored in the hydraulic storage volume 51. As the shaft 20 leaves the hydraulic lockout actuator 15, when the hydraulic valve 40 is in its normally open position, the hydraulic fluid in the storage volume 51 is forced back into the hydraulic lockout actuator 15 by the pressurized gas volume 52. When the hydraulic valve 40 is electrically signaled to close then the piston 25 is locked from inward motion as required to defeat the coil spring 11.

In this manner, the coil spring 11 can be selectably locked out and, therefore, the overall spring rate acting on the corner of the vehicle, $K_{sr}$, actively switched between two distinct modes of operation, independently of ride height or vehicle load. This arrangement provides a method of choosing between an optimal handling setting, characterized by a relatively higher natural frequency, and an optimal ride comfort setting, characterized by a relatively lower natural frequency. As a matter of practical application on a four wheel vehicle, a position sensor can be implemented on each of the four lockout actuators 15 of each suspension corner, so that the four associated hydraulic valves 40 can be switched to their closed, or blocked, positions in a coordinated manner so as to maintain matched ride heights.

In a further embodiment of the present invention, a hydraulic pressure source, such as a pump or accumulator, is introduced that allows the cylindrical piston 25 of the hydraulic lockout actuator 15 to be powered to a predetermined position so that all four corners of the car are assured of being at a matched and optimized ride height for the ride and handling requirements of the vehicle.

Figure 5:
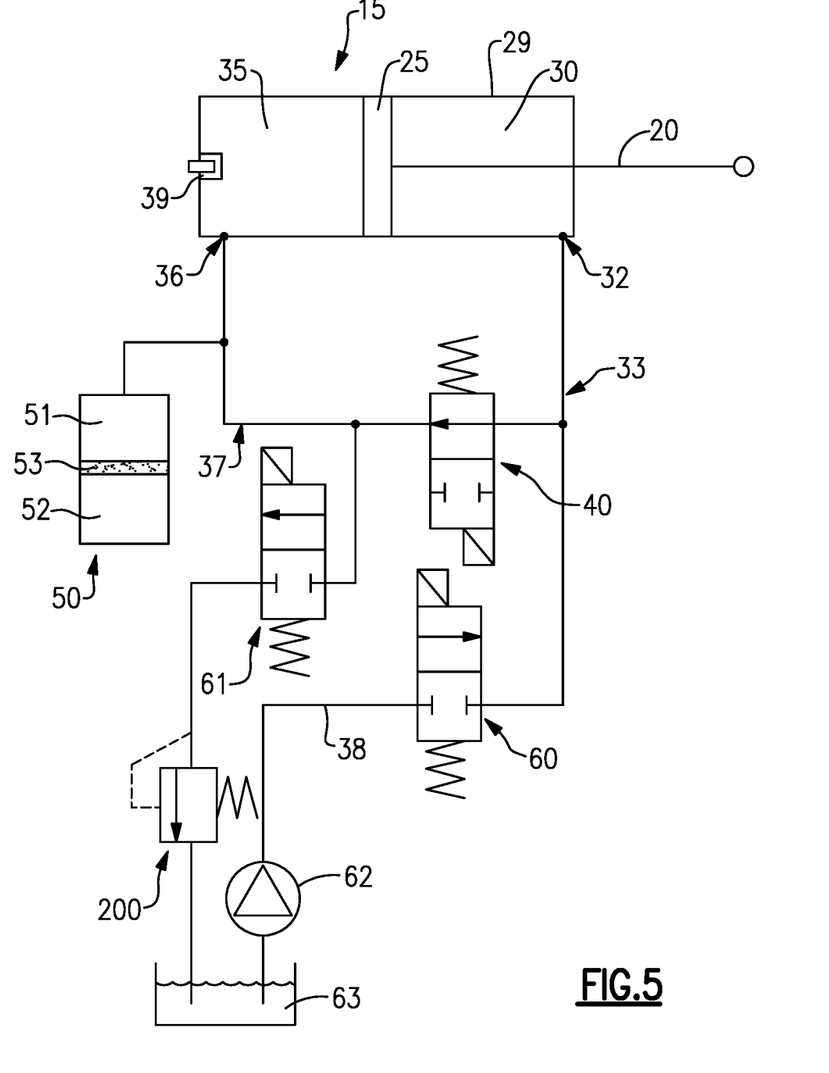
FIG. 5 is a schematic view of one example embodiment of a hydraulic control circuit used to provide a desired lower ride height to provide a desired handling setting.

Making reference to FIG. 1, when the coil spring 11 and torsion bar spring 10 act in series, in the first mode of operation, the ride height of the corner of the vehicle is determined by its corner mass and the overall combined series spring rate. The initial setting of the ride height is normally adjusted by extending or retracting the pushrod 100 via a screw thread sleeve or similar arrangement. When the hydraulic lockout actuator 15 is activated and the coil spring 11 is locked out, the average ride height naturally increases, without additional intervention, as the corner mass stays the same, but the overall spring rate substantially increases. This increased ride height is the opposite of what is desired to achieve optimal handling, as an increased natural frequency and lower ride height offers a superior combination. FIG. 5 shows a schematic of a hydraulic circuit that provides an ideal predetermined lower ride height when the coil spring 11 is locked out and the natural frequency has been increased to provide an optimal handling setting. A two port, two position, electrically piloted hydraulic valve 40 is connected between the first external port 32 and second external port 36 of the hydraulic lockout actuator 15 via hydraulic lines 33 and 37 respectively. The hydraulic valve 40 is configured to be normally open so that the hydraulic lines 33 and 37 are connected directly with no blockage. In this configuration, hydraulic fluid can flow freely between the two hydraulic volumes 30 and 35. In this way, the cylindrical piston 25 is free to move within the cylindrical bore 29. As previously described, for the sake of practical operation, a compensator 50 is introduced in the hydraulic circuit within the hydraulic line 37 so as to provide a volume for the hydraulic fluid displaced by the shaft 20 entering the hydraulic lockout actuator 15 to be stored. Additionally, a hydraulic pump 62, or similar pressure source, is provided that draws low pressure hydraulic fluid from a reservoir 63 and delivers it to a hydraulic line 38. A second two port, two position, electrically piloted hydraulic valve 60 is connected between the hydraulic lines 38 and 33. The hydraulic valve 60 is configured to be normally closed so that the pressure created by the hydraulic pump 62 is normally blocked from entering the hydraulic line 33. A third two port, two position, electrically piloted hydraulic valve 61 is connected between the hydraulic line 37 and the reservoir 63. The hydraulic valve 61 is configured to be normally closed so that hydraulic line 37 is normally blocked from the reservoir. A self-piloted pressure relief valve 200 is additionally introduced between the hydraulic valve 61 and the reservoir 63 so as to maintain a predetermined minimum pressure in the hydraulic line 37 and hydraulic volumes 35 and 51. When a suitable electrical signal is simultaneously imparted on the hydraulic valves 40, 60 and 61, they all change state and hydraulic valve 40 switches to a closed, or blocked, position and hydraulic fluid is prohibited from flowing between the two hydraulic lines 33 and 37 and, therefore, the hydraulic volumes 30 and 35 respectively. Additionally, the hydraulic valve 60 switches to an open position and high pressure hydraulic fluid is allowed to flow directly into hydraulic volume 30 via the hydraulic line 33, and hydraulic valve 61 also switches to an open position and the hydraulic fluid in the volume 35 is allowed to flow to the reservoir 63 via hydraulic line 37 and the pressure relief valve 200. The pressure relief valve 200 is configured to maintain a pressure in the hydraulic line 37 that prevents the compensator 50 from discharging its hydraulic storage volume 51 when hydraulic valve 61 switches to an open position. In this manner, the cylindrical piston 25 is driven to a fully retracted position within the cylindrical bore 29 of the hydraulic lockout actuator 15 via a pressure prescribed to be significantly higher than that generated by the vehicle suspension loads. An adjustable stop 39 is further provided so that the retracted position of the hydraulic lockout actuator 15 can be adapted to suit the correct ride height of the vehicle in its second mode of operation with the coil spring 11 locked out.

In this manner, the coil spring 11 can be selectably locked out and, therefore, the overall spring rate acting on the corner of the vehicle, $K_{sr}$, actively switched between two distinct modes of operation, with independently predetermined ride heights. This arrangement provides a method of choosing between an optimal handling setting, characterized by a relatively higher natural frequency and low ride height, and an optimal ride comfort setting, characterized by a relatively lower natural frequency and higher ride height. The hydraulically powered system described also assures that all four corners properly attain their correct ride heights at a predetermined speed and timing so as not to upset the balance of the vehicle.

Additionally, the damper 13 can be simply arranged to be actuated by the rocker 101 in a conventional manner. The damper can also be configured to be adaptive, as known in the art, so that, as the overall spring rate action on the corner of the vehicle, $K_{sr}$, is actively switched between two modes, the damping characteristics can be suitably matched to the selected natural frequency.

It should be understood that, although a particular system arrangement has been disclosed in the illustrated embodiments, other arrangements will benefit herefrom. For instance, the described vehicle suspension system could be altered so that a second torsion bar is utilized in place of the coil spring 11, with the lockout actuator located between the two torsion bars. The lockout actuator could be an electrical machine in place of the hydraulic device that has been described. Although the different examples have specific components shown in the illustrations, embodiments of this invention are not limited to those particular combinations. Although an example embodiment has been disclosed, a worker of ordinary skill in this art would recognize that certain modifications would come within the scope of the claims. For that reason, the following claims should be studied to determine their true scope and content.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A selectively switchable dual rate vehicle suspension system comprising:
    a pushrod actuated inboard spring configuration, oriented between an unsprung mass and a sprung mass of one corner of a vehicle, comprising a torsion bar spring of a first predetermined spring rate, $K_1$, and a coil spring of a second predetermined spring rate, $K_2$, arranged in series so as to provide a total combined spring rate $K_T$;
    a lockout actuator, arranged in parallel with the coil spring and configured so that, in a first mode, the lockout actuator is unlocked and allows the coil spring to move freely and, in a second mode, the lockout actuator is locked and prevents motion of the coil spring;
    such that, when the lockout actuator is in the first mode, an overall vehicle suspension spring rate is defined by the series equation $1/K_T=1/K_1+1/K_2$, and when the lockout actuator is in the second mode, the overall vehicle suspension spring rate is substantially higher as defined by $K_T=K_1$, thus selectively and alternatively providing both a low rate, optimal ride comfort setting and a high rate, optimal handling setting.

2. The selectively switchable dual rate vehicle suspension system of claim 1, wherein the lockout actuator comprises a hydraulic cylinder and hydraulic circuit that selectively opens and closes a connection between two volumes within the hydraulic cylinder so as to provide the first mode and the second mode.

3. A selectively switchable dual rate vehicle suspension system comprising:
    a pushrod actuated inboard spring configuration, oriented between an unsprung mass and a sprung mass of one corner of a vehicle, comprising a torsion bar spring of a first predetermined spring rate, $K_1$, and a coil spring of a second predetermined spring rate, $K_2$, arranged in series so as to provide a total combined spring rate $K_T$;

a lockout actuator, arranged in parallel with the coil spring and configured so that, in a first mode, the lockout actuator is unlocked and allows the coil spring to move freely and, in a second mode, the lockout actuator is locked and prevents motion of the coil spring;

such that, when the lockout actuator is in the first mode, an overall vehicle suspension spring rate is defined by the series equation $1/K_T=1/K_1+1/K_2$, and when the lockout actuator is in the second mode, the overall vehicle suspension spring rate is substantially higher as defined by $K_T=K_1$, thus selectively and alternatively providing both a low rate, optimal ride comfort setting and a high rate, optimal handling setting;

wherein the lockout actuator comprises a hydraulic cylinder and hydraulic circuit that selectively opens and closes a connection between two volumes within the hydraulic cylinder so as to provide the first mode and the second mode, additionally, the hydraulic circuit is configured to power the hydraulic actuator so as to drive the coil spring to a predetermined position so that a ride height of the vehicle, in the $K_1$ spring rate mode, can be prescribed to differ from the ride height of the vehicle in the $1/K_1+1/K_2$ spring rate mode.

4. A selectively switchable dual rate vehicle suspension system comprising:

a pushrod actuated inboard spring configuration, oriented between an unsprung mass and a sprung mass of one corner of a vehicle, comprising a torsion bar spring of a first predetermined spring rate, $K_1$, and a coil spring of a second predetermined spring rate, $K_2$, arranged in series so as to provide a total combined spring rate $K_T$;

a lockout actuator, arranged in parallel with the coil spring and configured so that, in a first mode, the lockout actuator is unlocked and allows the coil spring to move freely and, in a second mode, the lockout actuator is locked and prevents motion of the coil spring;

such that, when the lockout actuator is in the first mode, an overall vehicle suspension spring rate is defined by the series equation $1/K_T=1/K_1+1/K_2$, and when the lockout actuator is in the second mode, the overall vehicle suspension spring rate is substantially higher as defined by $K_T=K_1$, thus selectively and alternatively providing both a low rate, optimal ride comfort setting and a high rate, optimal handling setting;

wherein the lockout actuator comprises a hydraulic cylinder and hydraulic circuit that selectively opens and closes a connection between two volumes within the hydraulic cylinder so as to provide the first mode and the second mode, additionally, the hydraulic circuit is configured to power the hydraulic actuator so as to drive the coil spring to a predetermined position so that a ride height of the vehicle, in the $K_1$ spring rate mode, can be relatively lower than in the $1/K_1+1/K_2$ spring rate mode.

5. The selectively switchable dual rate suspension system of claim 4, wherein the coil spring is compressed in the predetermined position to make the ride height relatively lower.

* * * * *